(12) United States Patent
Kanaya et al.

(10) Patent No.: US 8,161,737 B2
(45) Date of Patent: Apr. 24, 2012

(54) APPARATUS FOR AND METHOD OF PURIFYING EXHAUST GAS

(75) Inventors: Isamu Kanaya, Ageo (JP); Takayuki Adachi, Ageo (JP); Nobuhiko Masaki, Ageo (JP); Kiminobu Hirata, Ageo (JP); Jin Kusaka, Tokyo (JP); Keishi Takada, Tokyo (JP); Takeshi Mende, Tokyo (JP); Fumiyuki Tsurumi, Sagamihara (JP)

(73) Assignees: UD Trucks Corporation, Ageo-Shi (JP); Waseda University, Tokyo (JP); Tokyo Roki Co., Ltd., Yokohama-shi (JP)

( * ) Notice: Subject to any disclaimer, the term of this patent is extended or adjusted under 35 U.S.C. 154(b) by 188 days.

(21) Appl. No.: 12/770,029

(22) Filed: Apr. 29, 2010

(65) Prior Publication Data

US 2010/0269490 A1 Oct. 28, 2010

Related U.S. Application Data

(63) Continuation of application No. PCT/JP2008/064309, filed on Aug. 8, 2008.

(30) Foreign Application Priority Data

Oct. 31, 2007 (JP) .................................. 2007-283665

(51) Int. Cl.
*F01N 3/00* (2006.01)
(52) U.S. Cl. ................. 60/295; 60/273; 60/285; 60/297
(58) Field of Classification Search .................... 60/285, 60/295, 297
See application file for complete search history.

(56) References Cited

U.S. PATENT DOCUMENTS

| 7,263,825 B1* | 9/2007 | Wills et al. ..................... 60/295 |
| 2003/0230075 A1* | 12/2003 | Saito et al. ..................... 60/291 |
| 2006/0026950 A1 | 2/2006 | Kondou et al. |

(Continued)

FOREIGN PATENT DOCUMENTS

JP 2001-207829 A 8/2001

(Continued)

OTHER PUBLICATIONS

IB of WIPO, International Preliminary Report on Patentability, PCT/JP2008/064309, Jun. 10, 2010, 13 pages.

*Primary Examiner* — Thomas Denion
*Assistant Examiner* — Anthony Ayala Delgado
(74) *Attorney, Agent, or Firm* — Foley & Lardner LLP

(57) ABSTRACT

An exhaust gas pressure P, exhaust gas temperatures $T_U$ and $T_D$ on upstream and downstream of a DPF, a rotation speed Ne, a load Q, and an intake flow rate F as various operating conditions are read, and an amount of PM generated for short time $\Delta t$ is obtained to be added to a PM deposited amount m, and thus, to obtain an initial deposited amount. Exhaust gas properties and a space velocity SV are obtained based on various operating conditions, and the PM deposited amount m after a lapse of the short time $\Delta t$ is estimated from a PM deposited amount estimation equation "$m=m \cdot \exp(-B \cdot \Delta t)$" having been derived considering the exhaust gas properties and the space velocity SV. When the PM deposited amount m is equal to or more than a predetermined value, a forced regeneration processing in the DPF is executed, and thereafter, the PM deposited amount m is reset to 0.

8 Claims, 2 Drawing Sheets

U.S. PATENT DOCUMENTS

| | | | |
|---|---|---|---|
| 2007/0150162 A1 | 6/2007 | Hodjati et al. | |
| 2007/0199312 A1* | 8/2007 | Kapparos et al. | 60/297 |

FOREIGN PATENT DOCUMENTS

| | | |
|---|---|---|
| JP | 2002-97930 A | 4/2002 |
| JP | 2002-180821 A | 6/2002 |
| JP | 2002-332823 A | 11/2002 |
| JP | 2006-2672 A | 1/2006 |
| JP | 2006-46247 A | 2/2006 |
| JP | 2006-299857 A | 11/2006 |
| JP | 2007-515595 A | 6/2007 |
| JP | 2007-170193 A | 7/2007 |

* cited by examiner

APPARATUS FOR AND METHOD OF PURIFYING EXHAUST GAS

This application is a continuation of PCT/JP2008/064309, filed on Aug. 8, 2008.

BACKGROUND OF THE INVENTION

1. Field of the Invention

The present invention relates to an exhaust gas purification apparatus that removes a particulate matter (PM) in exhaust gas using a continuous regenerative diesel particulate filter (DPF), whereby the DPF can be forcibly regenerated at an appropriate time.

2. Description of the Related Art

In a diesel engine, combustion is performed in a region with a large air excess ratio λ, and therefore, the diesel engine has such a characteristic that although discharge amounts of carbon monoxide (CO) and hydrocarbon (HC) are small, discharge amounts of nitrogen oxide (NOx) and a PM are large. Therefore, as an exhaust gas purification apparatus that reduces the discharge amount of the PM, an exhaust gas purification apparatus that collects the PM by a DPF provided in an exhaust gas passage has been put to practical use. Since a clogging of the DPF advances with increasing the amount of the collected PM, a forced regeneration processing for suitably burning the PM is indispensable. Recently, research and development regarding a continuous regenerative DPF are progressing. The continuous regenerative DPF continuously oxidizes and removes the PM collected by the DPF at a relatively low temperature utilizing nitrogen dioxide ($NO_2$) generated by a diesel oxidation catalyst (DOC). However, when an exhaust gas temperature is low, the oxidation and removal of the PM utilizing $NO_2$ are insufficient, and therefore, the forced regeneration processing cannot be omitted in practice.

In order to determine the forced regeneration time of the DPF, Japanese Laid-Open Patent Publications Nos. 2006-46247 and 2002-180821 propose a technique of estimating an amount of deposited PM from a pressure loss of the DPF. Furthermore, Japanese Laid-Open Patent Publication No. 2006-2672 proposes a technique of integrating an amount of generated PM obtained from an exhaust air-fuel ratio and an amount of oxidized PM obtained from an exhaust gas temperature and the difference therebetween is regarded as the PM deposited amount. Moreover, Japanese Laid-Open Patent Publication No. 2001-207829 proposes a technique of mapping an amount of discharged PM and an amount of burned PM based on engine operating conditions and estimating the PM deposited amount from them.

SUMMARY OF THE INVENTION

However, the conventional proposed techniques do not consider exhaust gas properties and a space velocity closely associated with PM oxidation reaction and has obtained the amount of deposited PM based on a pressure loss of the DPF, air-fuel ratio and temperature of exhaust gas, or engine operating conditions, and therefore, it has been difficult to estimate the PM deposited amount under diverse situations with high accuracy. If the accuracy of estimating the PM deposited amount is insufficient, the forced regeneration processing in the DPF is not started at an appropriate time and may lead to, for example, reduction in output power and reduction in fuel consumption due to increase of the pressure loss of the DPF.

Thus, in view of the above-mentioned problems, an object of the present invention is to provide an apparatus for and method of purifying exhaust gas, which estimates an amount of deposited PM with high accuracy, using an equation for estimating the amount of deposited PM considering exhaust gas properties and a space velocity, whereby a DPF can be forcibly regenerated at an appropriate time, and an exhaust purification method.

Therefore, with reference to a PM deposited amount estimation equation derived from a corrected oxidation reaction rate formula that is obtained by application of a correction, corresponding to a reaction rate closely associated with a space velocity, to an oxidation reaction rate formula in which at least one oxidation reaction to oxidize the PM to produce carbon dioxide ($CO_2$) in a continuous regenerative filter is modeled, the amount of deposited PM after a lapse of short time is suitably estimated under the conditions specified by a temperature of the continuous regenerative filter, exhaust gas properties, and the space velocity. When the PM deposited amount is equal to or more than a predetermined value, a forced regeneration processing in the continuous regenerative filter is executed. At that time, in order to enhance the accuracy of estimating the PM deposited amount, the corrected oxidation reaction rate formula preferably further includes an oxidation reaction rate formula in which at least one oxidation reaction to oxidize the PM to produce CO in the continuous regenerative filter is modeled.

By virtue of the PM deposited amount estimation equation considering the exhaust gas properties and the space velocity varying from hour to hour upon a change of engine operating conditions, the PM deposited amount after a lapse of short time is estimated. At that time, in the PM deposited amount estimation equation, a correction considering the space velocity is applied to an oxidation reaction rate formula in which at least one oxidation reaction to oxidize PM to produce $CO_2$ in the continuous regenerative filter is modeled, and therefore, so properties that a reaction rate has an extreme value are reflected, and thus the PM deposited amount can be estimated with high accuracy. When the PM deposited amount is equal to or more than a predetermined value, it is determined that the time of forcibly regenerating the continuous regenerative filter has come, and the forced regeneration processing is executed. Therefore, the continuous regenerative filter can be forcibly regenerated at an appropriate time.

DESCRIPTION OF THE PREFERRED EMBODIMENTS

Figure 1:
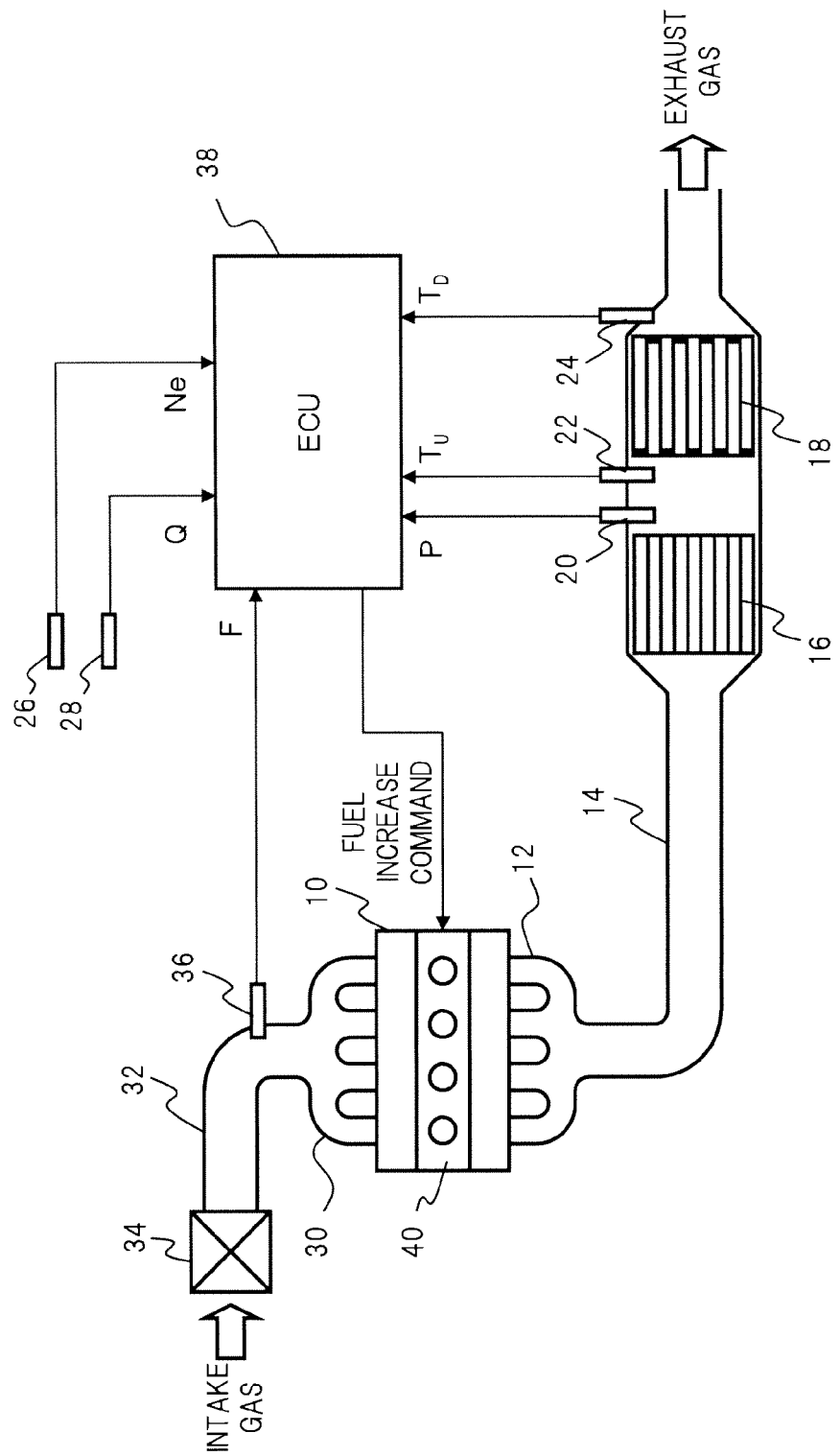
FIG. 1 is an overall configuration view of an exhaust gas purification apparatus embodying the present invention.

Before explaining in detail an exhaust gas purification apparatus embodying the present invention, a PM deposited amount estimation equation considering exhaust gas properties and a space velocity is described.

In a DPF, PM oxidation reaction formulae utilizing $NO_2$ can be represented as:

$$C + 2NO_2 \rightarrow CO_2 + 2NO \quad (1)$$

$$C + NO_2 \rightarrow CO + NO \quad (2)$$

$$C + \tfrac{1}{2}O_2 + NO_2 + (NO_2) \rightarrow CO_2 + NO + (NO_2) \quad (3)$$

$$C + \tfrac{1}{2}O_2 + (NO_2) \rightarrow CO + (NO_2) \quad (4)$$

According to oxidation reaction kinetics of carbon black by $NO_2$ ("Carbon", USA, Elsevier Science Ltd., 2002, March, Volume 40, Number 3, p. 335-343), in the PM oxidation reaction formulae (1) to (4), amounts $dm_1$ to $dm_4$ of PM oxidized for short time dt are modeled to be thereby represented as the following PM oxidation reaction rate formulae.

In the following description, the PM oxidation reaction rate formulae respectively corresponding to the PM oxidation reaction formulae (1) to (4) are distinguished by suffixes 1 to 4.

$$-\frac{1}{m}\left(\frac{dm}{dt}\right)_1 = k_1 P_{NO_2}^{\alpha}(1 + ax_{H_2O}^{\phi}) \quad \text{[Math 1]}$$

$$-\frac{1}{m}\left(\frac{dm}{dt}\right)_2 = k_2 P_{NO_2}^{\beta}(1 + bx_{H_2O}^{\mu})$$

$$-\frac{1}{m}\left(\frac{dm}{dt}\right)_3 = k_3 P_{NO_2}^{\delta} x_{O_2}^{\gamma}(1 + cx_{H_2O}^{\theta})$$

$$-\frac{1}{m}\left(\frac{dm}{dt}\right)_4 = k_4 P_{NO_2}^{\xi} x_{O_2}^{\gamma}(1 + cx_{H_2O}^{\theta})$$

Here, variables in the PM oxidation reaction rate formulae are as follows:

$P_{NO2}$: an $NO_2$ mol partial pressure of exhaust gas
$X_{H2O}$: an $H_2O$ mol partial pressure of exhaust gas
$X_{O2}$: an $O_2$ mol partial pressure of exhaust gas
α: a reaction order of $NO_2$ in the PM oxidation reaction formula (1)
β: a reaction order of $NO_2$ in the PM oxidation reaction formula (2)
δ: a reaction order of $NO_2$ in the PM oxidation reaction formula (3)
ξ: a reaction order of $NO_2$ in the PM oxidation reaction formula (4)
φ: a reaction order of $H_2O$ in the PM oxidation reaction formula (1)
μ: a reaction order of $H_2O$ in the PM oxidation reaction formula (2)
θ: a reaction order of $H_2O$ in the PM oxidation reaction formulae (3) and (4)
γ: a reaction order of $O_2$ in the PM oxidation reaction formulae (3) and (4)
a to c: constants
$k_i$: rate constant of chemical reaction (i=1 to 4)

According to an Arrhenius equation, when a constant (a frequency factor) unrelated to a temperature is A, an activation energy (an Arrhenius parameter) is E, a gas constant is R, and an absolute temperature is T, the rate constant $k_i$ of chemical reaction can be specifically represented as follows:

$$k_i = A_i \exp\left(\frac{-E_i}{RT}\right) \quad \text{[Math 2]}$$

With regard to a general reaction rate formula r in which a reaction rate has an extreme value, according to "Chemical kinetics" (Keii, tominaga, Tokyo Kagaku Doujin, 2001, February, third edition), when a rate constant is k and $K_x$, a chemical species concentration is X, and a reaction order is q, the reaction rate formula r is represented as follows:

$$r = \frac{kK_X X}{(1 + K_X X)^q} \quad \text{[Math 3]}$$

When the reaction rate formula r is modified as the following formula, as a fitting parameter in which a chemical species concentration X is a space velocity SV, and a reaction order q is 1 or 2, a proportional expression related to the space velocity SV is obtained. The rate constant k is calculated from "intercept×slope" of the proportional expression, and the rate constant $K_x$ is calculated from "intercept/slope".

$$\left(\frac{SV}{r}\right)^{\frac{1}{q}} = \left(\frac{1}{kK_{SV}}\right)^{\frac{1}{q}} + \left(\frac{K_{SV}}{k}\right)^{\frac{1}{q}} SV \quad \text{[Math 4]}$$

A product obtained from PM oxidation reaction in the DPF is mainly composed of $CO_2$, and therefore, as the following formulae, the reaction rate formula r is used, and the PM oxidation reaction rate formulae in which a reaction rate correction is applied only to the PM oxidation reaction formulae (1) and (3) are derived.

$$-\frac{1}{m}\left(\frac{dm}{dt}\right)_1 = k_1 P_{NO_2}^{\alpha}(1 + ax_{H_2O}^{\phi})\frac{K_{SV} SV}{(1 + K_{SV} SV)^q} \quad \text{[Math 5]}$$

$$-\frac{1}{m}\left(\frac{dm}{dt}\right)_2 = k_2 P_{NO_2}^{\beta}(1 + bx_{H_2O}^{\mu})$$

$$-\frac{1}{m}\left(\frac{dm}{dt}\right)_3 = k_3 P_{NO_2}^{\delta} x_{O_2}^{\gamma}(1 + cx_{H_2O}^{\theta})\frac{K_{SV} SV}{(1 + K_{SV} SV)^q}$$

$$-\frac{1}{m}\left(\frac{dm}{dt}\right)_4 = k_4 P_{NO_2}^{\xi} x_{O_2}^{\gamma}(1 + cx_{H_2O}^{\theta})$$

In the DPF, since PM oxidation is performed by the PM oxidation reaction formulae (1) to (4), the PM oxidized amount dm for the short time dt can be represented by the following equation:

$$-\frac{1}{m}\frac{dm}{dt} = \sum_{i=1}^{4} -\frac{1}{m}\left(\frac{dm}{dt}\right)_i \quad \text{[Math 6]}$$

In the formula representing the PM oxidized amount dm for the short time dt, the right side is assumed to be B, and the formula is integrated and modified, whereby the following PM deposited amount estimation equation for use in the estimation of a PM deposited amount m after time t is derived. A variable C in the PM deposited amount estimation equation is a variable expressed by an indefinite integral and shows the PM deposited amount m at time t=0.

$$m = C\exp(-Bt) \quad \text{[Math 7]}$$

Next, the exhaust gas purification apparatus embodying the present invention will be detailed.

In FIG. 1, in an exhaust pipe 14 connected to an exhaust manifold 12 of a diesel engine 10, a DOC 16 and a continuous regenerative DPF 18 arranged in that order are provided along an exhaust gas circulation direction. The DOC 16 oxidizes NO to $NO_2$. The DPF 18 continuously oxidizes and removes PM while collecting PM. A base surface of the DPF 18 is coated with a catalytic component such as noble metal for the purpose of reducing a PM oxidation temperature.

The exhaust gas purification apparatus includes as control systems a pressure sensor 20, temperature sensors 22 and 24 as temperature detectors, a rotation speed sensor 26 as a rotation speed detector, and a load sensor 28 as a load detector. The pressure sensor 20 detects an exhaust gas pressure P on an exhaust gas upstream side of the DPF 18. The temperature sensors 22 and 24 respectively detect an exhaust gas temperature $T_u$ on an exhaust gas upstream side of the DPF 18 and an exhaust gas temperature $T_d$ on an exhaust gas downstream side of the DPF 18 in order to indirectly detect a temperature T of the DPF 18 in terms of improvement of durability. The rotation speed sensor 26 detects an engine rotation speed Ne. The load sensor 28 detects an engine load Q such as an accelerator opening, a fuel injection amount, and a supercharging pressure. An intake pipe 32 connected to an intake manifold 30 of the diesel engine 10 includes an air flow meter 36 that detects an intake flow F of an intake gas from which impurities such as dusts have been removed by an air cleaner 34.

Each output signal of the pressure sensor 20, the temperature sensors 22 and 24, the rotation speed sensor 26, the load sensor 28, and the air flow meter 36 is input to a control unit 38 having a computer built therein. The control unit 38 then executes a control program stored in, for example, ROM (Read Only Memory) thereof, whereby the PM deposited amount is estimated, and then, a fuel increase command signal is output to, for example, a fuel injection device 40 as a forced regeneration device in order that, if necessary, an exhaust gas temperature is raised to start a forced regeneration processing.

Figure 2:
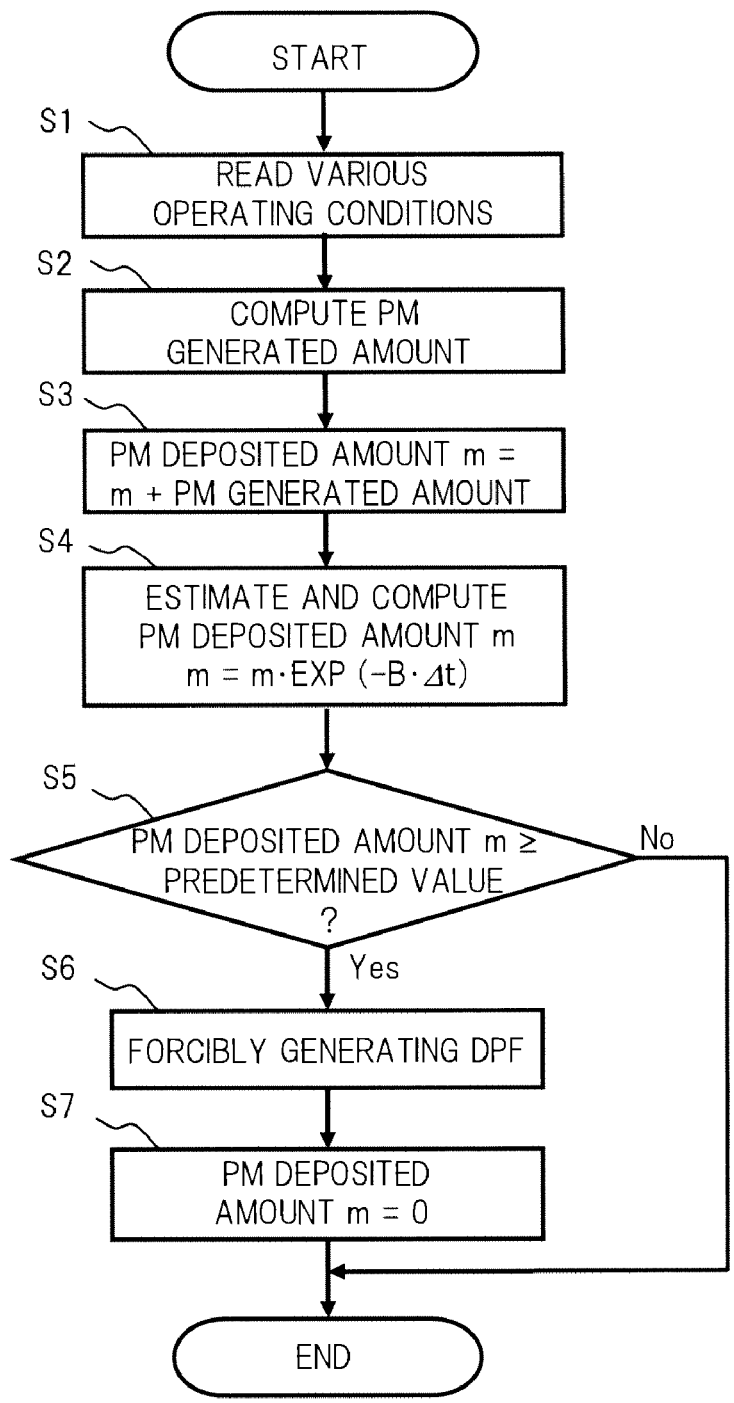
FIG. 2 is a flow chart showing processing contents of a control program.

FIG. 2 shows processing contents of the control program repeatedly executed by the control unit 38 at every short times $\Delta t$ upon starting up the diesel engine 10.

In step 1 (to be abbreviated as "S1" in FIG. 2, and the same holds for the following steps), as various operating conditions of the diesel engine 10, the exhaust gas pressure P from the pressure sensor 20, the exhaust gas temperatures $T_U$ and $T_D$ from the temperature sensors 22 and 24, the rotation speed Ne from the rotation speed sensor 26, the load Q from the load sensor 28, and the intake flow F from the air flow meter 36 are respectively read.

In step 2, the amount of PM generated for the short time $\Delta t$, that is, the amount of PM flowing to the DPF 18 is computed. Specifically, with reference to a control map in which the PM generated amount corresponding to a rotation speed and a load is set, the PM generated amount corresponding to the rotation speed Ne and the load Q is obtained. In order to enhance an computing accuracy of the PM generated amount, a $\lambda$ correction corresponding to an air excess ratio $\lambda$ may be applied to the PM generated amount obtained from the control map.

In step 3, the PM generated amount is added to the PM deposited amount m, whereby the PM deposited amount m at the time t=0, that is, an initial deposited amount is obtained.

In step 4, the above-mentioned PM deposited amount estimation equation is utilized, and the PM deposited amount m after a lapse of the short time $\Delta t$ is estimated and computed. Specifically, an arithmetic average of the exhaust gas temperatures $T_U$ and $T_D$ is regarded as the temperature T of the DPF 18, and the rate constants $k_i$ and $K_{SV}$ of a chemical reaction are respectively obtained. The $NO_2$ mol partial pressure $P_{NO2}$, the $H_2O$ mol partial pressure $x_{H2O}$, the $O_2$ mol partial pressure $x_{O2}$ of exhaust gas and the space velocity SV are substituted for the PM oxidation reaction rate formulae, and B corresponding to the right side is obtained. Thereafter, the PM deposited amount m after a lapse of the short time $\Delta t$ is calculated from a PM deposited amount estimation equation $m=m\cdot\exp(-B\cdot\Delta t)$.

At that time, the $NO_2$ mol partial pressure $P_{NO2}$, the $H_2O$ mol partial pressure $x_{H2O}$, the $O_2$ mol partial pressure $x_{O2}$ may not be directly detected, and, in addition, in terms of improvement of durability, with reference to a control map in which a $NO_2$ concentration, an $H_2O$ concentration, and a $O_2$ concentration corresponding to the rotation speed and the load are set, each concentration corresponding to the rotation speed Ne and the load Q is obtained, and the exhaust gas pressure P is divided by each concentration, whereby the respective partial pressures may be obtained. The space velocity SV may be obtained by dividing an exhaust flow rate, computed based on the intake flow rate F and the fuel injection amount, by the capacity of the DPF 18. With regard to the intake flow rate F, with reference to a control map in which the intake flow rate corresponding to the rotation speed and the load is set, the intake flow rate F corresponding to the rotation speed Ne and the load Q may be indirectly obtained. An exhaust gas properties detector is realized by the processing for obtaining the $NO_2$ mol partial pressure $P_{NO2}$, the $H_2O$ mol partial pressure $x_{H2O}$, and the $O_2$ mol partial pressure $x_{O2}$, and, at the same time, a space velocity detector is realized by the processing for obtaining the space velocity SV.

In step 5, whether or not the PM deposited amount m is equal to or more than a predetermined value is determined. The predetermined value is a threshold value for use in determination whether or not the forced regeneration processing in the DPF 18 should be started, and, for example, it is set to an upper limit of the deposited amount just enough to keep the functions of the DPF 18. When the PM deposited amount m is equal to or more than the predetermined value, the flow proceeds to step 6 (Yes). When the PM deposited amount m is less than the predetermined value, the processing is terminated (No).

In step 6, the fuel increase command is output to the fuel injection device 40, whereby the forced regeneration processing in the DPF 18 is executed. The processing for outputting the fuel increase command to the fuel injection device 40 corresponds to the forced regeneration processing. The forced regeneration processing in the DPF 18 includes not only the increase in fuel, but well-known techniques such as starting up of an electric heater added to the DPF 18 can be used.

In step 7, when the forced regeneration processing in the DPF 18 is terminated, it is regarded that the whole PM deposited on the DPF 18 is burned, and therefore, the PM deposited amount m is reset to 0.

According to the exhaust gas purification apparatus, on the basis of the initial deposited amount to which the amount of PM generated for the short time $\Delta t$ is added, by virtue of the PM deposited amount estimation equation considering the exhaust gas properties and the space velocity SV varying from hour to hour upon the change of the operating conditions of the diesel engine 10, the PM deposited amount m after a lapse of the short time $\Delta t$ is estimated. At that time, in the PM deposited amount estimation equation, a correction considering the space velocity SV is applied to the PM oxidation reaction rate formula in which the PM oxidation reaction formula in the DPF 18 is modeled, and therefore, so properties that the reaction rate has an extreme value are reflected, and thus the PM deposited amount can be estimated with high accuracy. When the PM deposited amount m is equal to or more than a predetermined value, it is determined that the forced regeneration time of the DPF 18 has come, and the forced regeneration processing is executed.

Thus, the forced regeneration processing in the DPF 18 is started at an appropriate time, and, for example, the reduction in output power and the reduction in fuel consumption due to increase of the pressure loss of the DPF 18 can be suppressed.

In the PM deposited amount estimation equation, when at least only one of the PM oxidation reaction rate formulae respectively corresponding to the PM oxidation reaction formulae (1) and (3) is used, the increase in the computation load can be suppressed while maintaining the accuracy of estimating the PM deposited amount to a certain extent. In addition to the PM oxidation reaction rate formulae (1) and (3), when the PM oxidation reaction rate formula corresponding to at least one of the PM oxidation reaction formulae (2) and (4) is used, the accuracy of estimating the PM deposited amount can be further enhanced.

The temperature T of the DPF 18 is not indirectly detected from the arithmetic average of the exhaust gas temperatures on the exhaust gas upstream side and the exhaust gas downstream side of the DPF 18, but may be directly detected from a temperature sensor added to the DPF 18. The $NO_2$ concentration, the $H_2O$ concentration, and the $O_2$ concentration of the exhaust gas and the exhaust flow rate are not indirectly obtained from the rotation speed Ne, the load Q, and so on, but may be directly detected using a well-known sensor such as an $O_2$ sensor.

It should be appreciated that the entire contents of Japanese Patent Application No. 2007-283665, filed on Oct. 31, 2007, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. An exhaust gas purification apparatus comprising:
   a continuous regenerative filter that oxidizes a particulate matter utilizing nitrogen dioxide while collecting the particulate matter in an exhaust gas;
   a temperature detector that detects a temperature of the continuous regenerative filter;
   an exhaust gas properties detector that detects properties of the exhaust gas passing through the continuous regenerative filter;
   a space velocity detector that detects a space velocity of the exhaust gas passing through the continuous regenerative filter;
   a forced regenerator that forcibly regenerates the continuous regenerative filter; and
   a control unit configured to read respective detection signals from the temperature detector, the exhaust gas properties detector, and the space velocity detector and controls the forced regenerator based on the detection signals,
   wherein the control unit estimates an amount of the particulate matter deposited on the continuous regenerative filter after a lapse of short time under conditions specified by the filter temperature, the exhaust gas properties, and the space velocity with reference to an equation for estimating the amount of the deposited particulate matter derived from a corrected oxidation reaction rate formula that is obtained by application of a correction, corresponding to a reaction rate related with the space velocity, to an oxidation reaction rate formula in which at least one oxidation reaction to oxidize the particulate matter to produce carbon dioxide in the continuous regenerative filter is modeled, and then, when the deposited amount is equal to or more than a predetermined value, executes a forced regeneration processing in the continuous regenerative filter by means of the forced regenerator.

2. The exhaust gas purification apparatus according to claim 1, wherein the corrected oxidation reaction rate formula further comprises an oxidation reaction rate formula in which at least one oxidation reaction to oxidize the particulate matter to produce carbon monoxide in the continuous regenerative filter is modeled.

3. The exhaust gas purification apparatus according to claim 1, wherein the temperature detector indirectly detects the filter temperature from an arithmetic average of exhaust gas temperatures on an exhaust gas upstream side and an exhaust gas downstream side of the continuous regenerative filter.

4. The exhaust gas purification apparatus according to claim 1, wherein the exhaust gas properties are mol partial pressures of nitrogen dioxide, oxygen, and water vapor contained in the exhaust gas passing through the continuous regenerative filter.

5. The exhaust gas purification apparatus according to claim 4, wherein the mol partial pressures of nitrogen dioxide, oxygen, and water vapor are respectively detected by multiplying concentrations of nitrogen dioxide, oxygen, and water vapor in the exhaust gas by an exhaust gas pressure.

6. The exhaust gas purification apparatus according to claim 5, further comprising:
   a rotation speed detector that detects a rotation speed of an engine; and
   a load detector that detects a load of the engine,
   wherein the concentrations of nitrogen dioxide, oxygen, and water vapor in the exhaust gas are indirectly obtained from the rotation speed and the load.

7. An exhaust purification method using an exhaust gas purification apparatus, which is configured to comprise a continuous regenerative filter that oxidizes a particulate matter utilizing nitrogen dioxide while collecting the particulate matter in an exhaust gas, a temperature detector that detects a temperature of the continuous regenerative filter, an exhaust gas properties detector that detects properties of the exhaust gas passing through the continuous regenerative filter, a space velocity detector that detects a space velocity of the exhaust gas passing through the continuous regenerative filter, a forced regenerator that forcibly regenerates the continuous regenerative filter, and a control unit configured to read respective detection signals from the temperature detector, the exhaust gas properties detector, and the space velocity detector and controls the forced regenerator based on the detection signals,
   wherein the control unit estimates an amount of the particulate matter deposited on the continuous regenerative filter after a lapse of short time under conditions specified by the filter temperature, the exhaust gas properties, and the space velocity with reference to an equation for estimating the amount of the deposited particulate matter derived from a corrected oxidation reaction rate formula that is obtained by application of a correction, corresponding to a reaction rate related with the space velocity, to an oxidation reaction rate formula in which at least one oxidation reaction to oxidize the particulate matter to produce carbon dioxide in the continuous regenerative filter is modeled, and then, when the deposited amount is equal to or more than a predetermined value, executes a forced regeneration processing in the continuous regenerative filter by means of the forced regenerator.

8. The exhaust purification method according to claim 7, wherein the corrected oxidation reaction rate formula further comprises an oxidation reaction rate formula in which at least one oxidation reaction to oxidize the particulate matter to produce carbon monoxide in the continuous regenerative filter is modeled.

* * * * *